United States Patent [19]

Horimoto

[11] Patent Number: 4,465,343
[45] Date of Patent: Aug. 14, 1984

[54] ZOOM LENS SYSTEM

[75] Inventor: Mitsuaki Horimoto, Osaka, Japan

[73] Assignee: Minolta Camera Kabushiki Kaisha, Osaka, Japan

[21] Appl. No.: 254,409

[22] Filed: Apr. 15, 1981

[30] Foreign Application Priority Data

May 10, 1980 [JP] Japan .................................. 55-62046
Jul. 9, 1980 [JP] Japan .................................. 55-94260
Jul. 24, 1980 [JP] Japan .................................. 55-102194

[51] Int. Cl.³ .............................................. G02B 7/04
[52] U.S. Cl. .................................... 350/428; 350/426; 350/427
[58] Field of Search ............... 350/426, 427, 428, 457, 350/474

[56] References Cited

U.S. PATENT DOCUMENTS 3,891,304 6/1975 Muszumanski et al. ............ 350/428
4,170,402 10/1979 Nakagawa .......................... 350/426

FOREIGN PATENT DOCUMENTS 55-35323 3/1980 Japan .

Primary Examiner—John K. Corbin
Assistant Examiner—Paul M. Dzierzynski
Attorney, Agent, or Firm—Jackson, Jones & Price

[57] ABSTRACT

The present invention is directed to a three-group type wide angle zoom lens system which comprises, from the object to the image side, a first lens group of a negative refractive power movable along the optical axis for zooming, the first lens group including at least two positive lens elements and at least one negative lens element, a second lens group of a positive refractive power movable separately from the first lens group along the optical axis for zooming, the second lens group being of the triplet type formed by sandwitching a negative refractive power component in between a pair of positive refractive power components, and a third lens group of a positive refractive power movable separately from the first and second lens groups along the optical axis for zooming, the third lens group including at least one positive lens element, wherein the lens system fulfills the following condition:

$2.5 < f_{III}/f_{II} < 4.5$ wherein:
$f_{II}$ and $f_{III}$ represent the focal lengths of the second and third lens groups, respectively. The third lens group is of a simple and light-weight construction and utilizable for focusing or macro focusing by means of its axial movement.

17 Claims, 79 Drawing Figures

Spherical Aberration

Astigmatism

Distortion

Spherical Aberration

Astigmatism

Distortion

Spherical Aberration

Astigmatism

Distortion

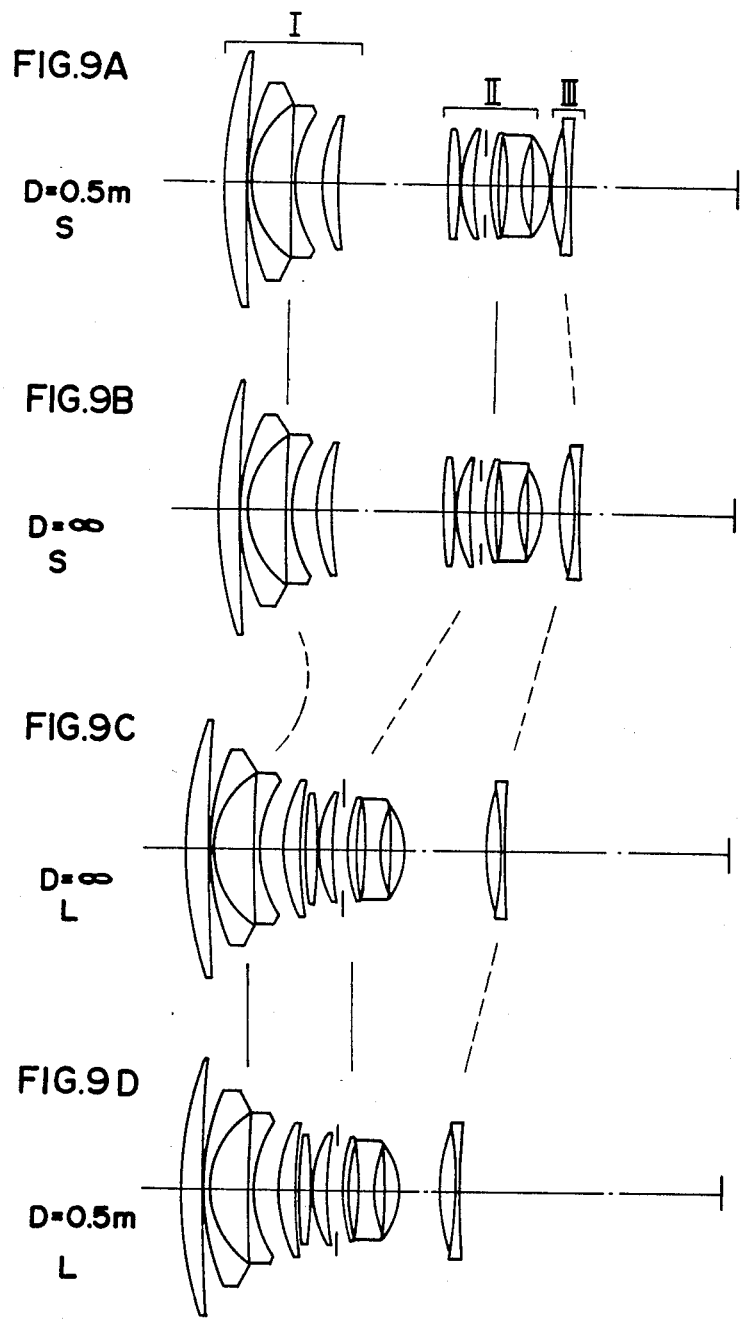

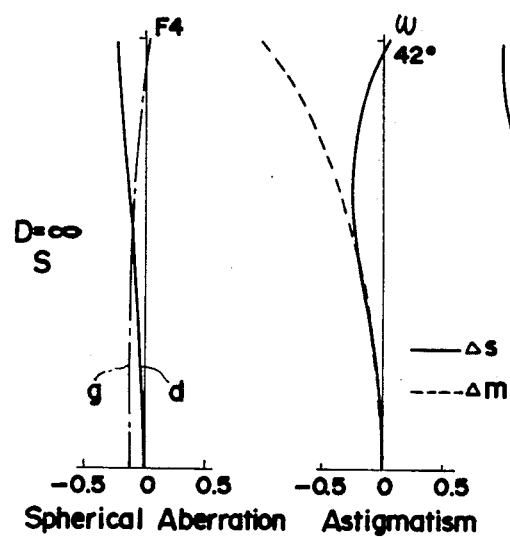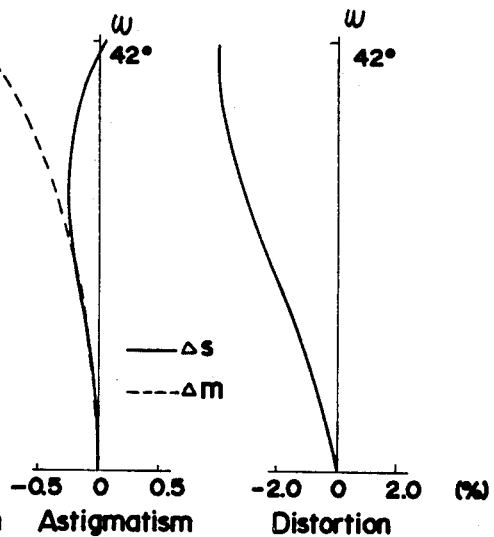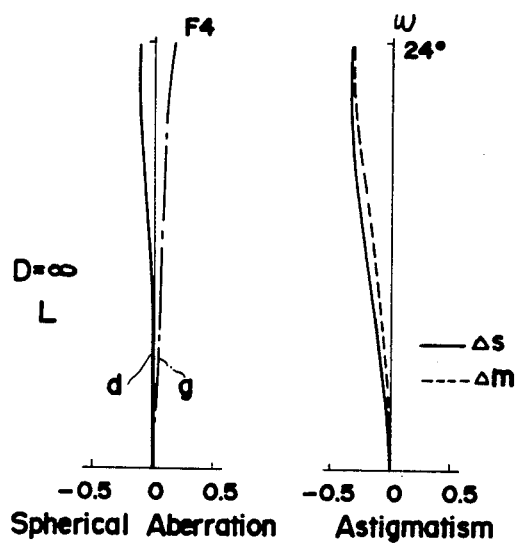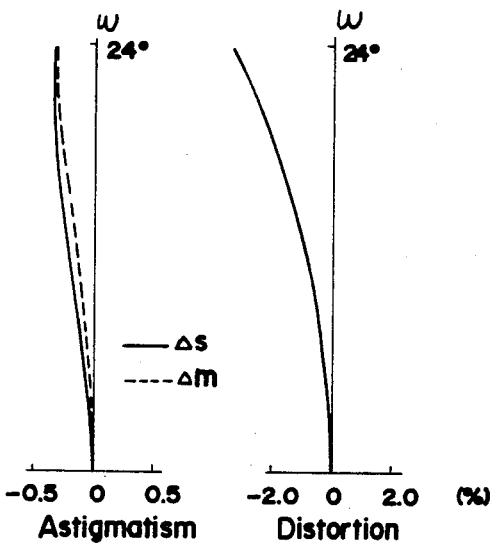

D=1m
S

D=∞
S

D=∞
L

D=1m
L

S
D=∞

M
D=∞

L
D=∞

L
D=0.5m
($\beta$=-0.12)

L
D=0.25m
($\beta$=-0.32)

Spherical Aberration

Astigmatism

Distortion

Spherical Aberration

Astigmatism

Distortion

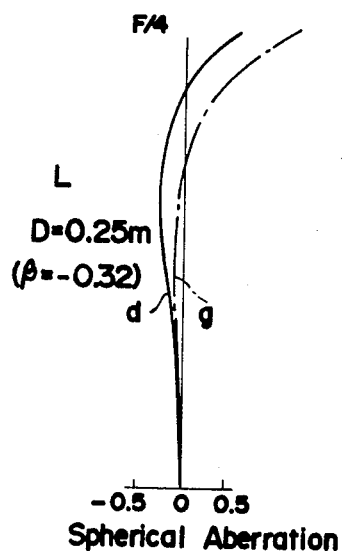 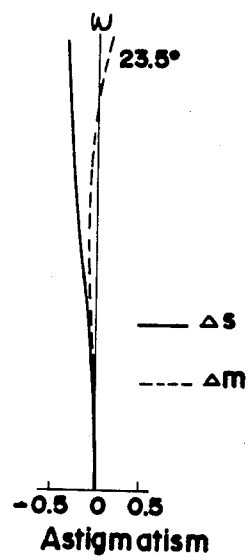 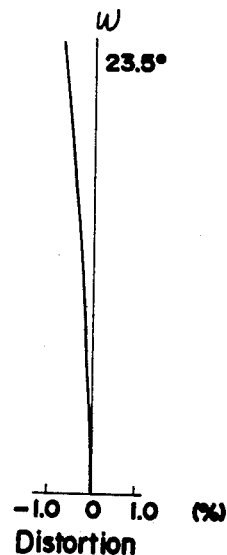
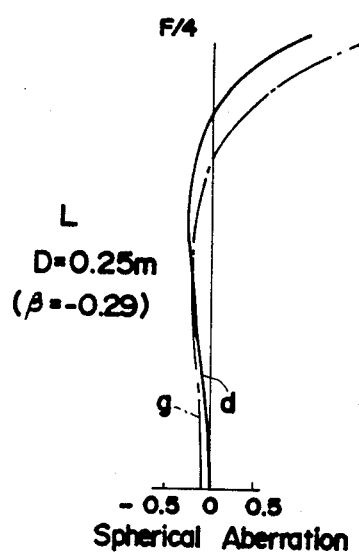 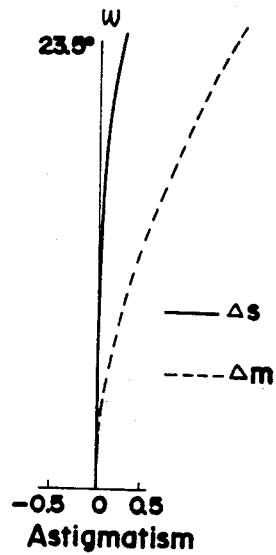 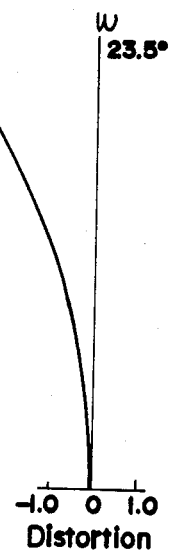

ZOOM LENS SYSTEM

BACKGROUND OF THE INVENTION

1. Field of the Invention

The present invention relates to a zoom lens system, and more particularly to a zoom lens system having a negative front lens group, which is applicable to a wide angle zoom lens system or to a zoom lens system including in its variable field angle range the standard field angle.

2. Description of the Prior Art

In this field of art, a two-group type wide angle zoom lens system having a negative front lens group and a positive rear lens group has been known to be suitable for a zooming made of operation zoom ratio of about 2 ranging from a standard to wide field angle.

However, the lens speed of such a lens system has to be lowered to insure adequate aberration correction while the size of the lens system must be increased if the maximum field angle in the zoom range is also desired to be increased.

Further, the tolerance to any manufacturing error becomes more strict with respect to the rear lens group because of the increased aperture ratio thereof if the refractive powers of the front and rear lens groups are increased in accordance with the demand of compact size and light weight so that the rear lens group must be designed to receive a widely divergent light pencil transmitted from the front lens group of the increased refractive power.

Japanese Patent Application Laid Open No. 55-35323 also discloses a three-group wide angle zoom lens system having a negative first lens group, a positive second lens group, and a positive third lens group. However, this design approach uses only positive lens element in the first lens group and does not employ a triplet type of lens group in the second lens group. This design approach emphasizes a strong refractive power in the first lens group, a weak refractive power in the second lens group and a strong refractive power in the third lens group.

The prior art is still seeking an optimum zoom lens system that further provides a macro-focusing capability.

SUMMARY OF THE INVENTION

An object of the present invention is to provide a wide angle zoom lens system of relatively high speed with a relatively great maximum field angle in the zoom range.

Another object of the present invention is to provide a wide angle zoom lens system with the aberrations well corrected across the entire zoom range.

Still another object of the present invention is to provide a compact and light weight zoom lens system with a relatively generous tolerance to manufacturing error.

A further object of the present invention is to provide a zoom lens system with an improved focusing system.

An additional object of the present invention is to provide a zoom lens system with a focusing range extending to the macrophotography range.

The present invention is directed to a three-unit type zoom lens system comprising, from the object to the image side, a first lens group of a negative refractive power, a second lens group of a positive refractive power and a third lens unit of a positive refractive power, air spaces between the first and second lens groups and between the second lens group and third lens unit being movable for a zooming mode of operation, wherein the refractive power of the second lens group is greater than that of the third lens unit. Further, the third lens unit is utilizable for focusing or macro focusing by means of its axial movement.

The objects and features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS

FIGS. 9A, 9B, 9C and 9D represents schematic cross sectional views in various focal lengths of a third embodiment of the present invention;

FIGS. 10A, 10B and 10C represent graphic plots of the aberrations of the third embodiment for the shortest focal length;

FIGS. 11A, 11B and 11C represent graphic plots of the aberrations of the third embodiment for the longest focal length;

FIGS. 24A, 24B and 24C represent graphic plots of the aberrations of the fifth embodiment in macrofocusing; and FIGS. 25A, 25B and 25C represent graphic plots of the aberrations of the fifth embodiment in another mode of macro focusing.

DETAILED DESCRIPTION OF THE PREFERRED EMBODIMENTS

Figure 1A:
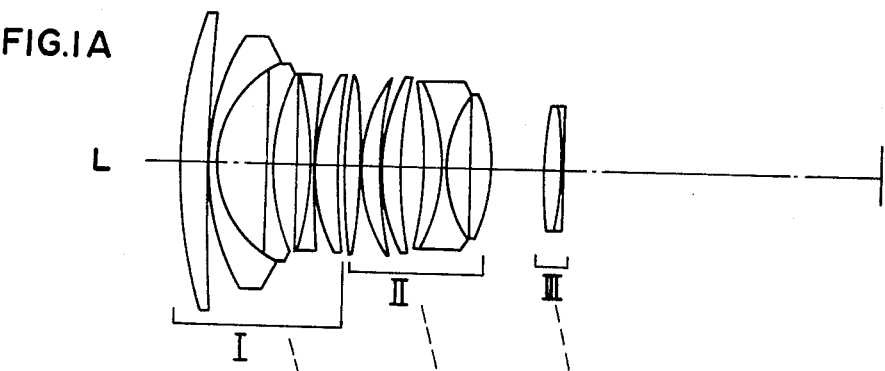
FIGS. 1A, 1B and 1C represent schematic cross sectional views in various focal lengths of a first embodiment of the present invention.

The following description is provided to enable any person skilled in the optical art to make and use the present invention and sets forth the best modes contemplated by the inventor of carrying out his invention. Various modifications, however, will remain readily apparent to those skilled in the art, since the generic principles of the present invention have been defined herein specifically to provide a three-group type zoom lens system.

The derivation of the specific parameters of the lens embodiments disclosed herein can be accomplished with the assistance of a computer. The present invention represents the parameters of a compromised balance of acceptable aberrations in a relatively easily manufactured lens assembly that is particularly suited for a 35 mm single lens reflex camera. The data presented herein in the tables, to be discussed subsequently, are more than adequate to permit a competent artisan in the optical art to reproduce the embodiments of the present invention. In the accompanying drawings, which supplement the following tables, the lenses in accordance with the present invention are illustrated schematically. As usual, in conventional lens diagrams, the light is assumed to travel from left to right. Due to the large number of lens elements involved, the drawings have omitted the symbols for the radii of curvature and axial distances. The tables, however, more than adequately provide this information.

In the tables, the minus (−) signs indicate surfaces concave toward the object side, while the surfaces without a sign are convex toward the object side. The radius of curvature is disclosed and is indicated by the letter, r, with a subscript corresponding to the consecutive surfaces of the lens elements from left to right. The axial distances are designated with the letter, d, again with the subscript indicating the distance consecutively from the left to the right. The axial distances will include both the thickness of the lens and the air spaces, and in this regard, the value of the axial distances between the lens elements are appropriately positioned in the tables relative to the values of the radius of curvature to indicate whether the axial distance is an air space or a thickness of the lens. With respect to each variable air space, three values are given corresponding to the shortest, medium and longest focal lengths, respectively, in this order. The tables also provide, with respect to each embodiment, the f number, the shortest, medium and longest focal lengths, and the field angles $2\omega$ for the respective focal lengths in the corresponding order. The refractive index is designated as N, while the Abbe number is $\nu$.

The term "lens element" in this specification means an optical element of a uniform glass material. Therefore, "a single lens element" is interpreted to consists of one lens element, and a "doublet" is interpreted to be a pair of lens elements cemented to each other. The term "group" refers to a plurality of lens elements, while the term "unit" refers to one or more lens elements.

Referring to the specific embodiments of the present invention disclosed in FIGS. 1, 5, 9, 14 and 19, the present invention provides a three-unit type zoom lens system comprising, from the object to the image side, a first lens group (I) of a negative refractive power including at least two positive lens elements and at least one negative lens element, a second lens group (II) of a positive refractive power, the second lens group (II) being of the triplet type formed by sandwitching a negative refractive power component in between a pair of positive refractive power components, and a third lens unit (III) of a positive refractive power including at least one positive lens element wherein an air space between the first and second lens groups and an air space between the second lens group and third lens unit are changeable for zooming as indicated by broken lines in the Figures, and the lens systems fulfills the following condition:

$$2.5 < f_{III}/f_{II} < 4.5 \tag{1}$$

wherein $f_{II}$ and $f_{III}$ represent the focal lengths of the second lens group and third lens unit, respectively.

According to the above feature, the present invention performs the zooming operation with the changes in aberrations accompanying zooming mode of operation sufficiently restrained. In more detail, the change in the air space between the first lens group (I) and the second lens group (II) can interpreted to provide an essential part of the effect to change the focal length, while the change in the air space between the second lens group (II) and the third lens unit (III) is interpreted to mainly have an effect of restraining the changes in aberrations and altering the total refractive power of the whole second lens group and third lens unit during the zooming.

The above condition (1) relates to the second lens group (II) of the triplet type in relation to the third lens unit (III) and for correcting spherical aberration. The condition (1) is also important for restraining any change in aberrations due to a change during focal length in zooming. If the lower limit is violated, an under-correction of spherical aberration would be caused and the effect of the change in the air space between the second lens group and third lens unit for restraining the change in aberrations, especially in the field curvature due to zooming would not be adequate since the refractive powers of the second lens group and third lens unit would approximate each other. In contrast thereto, if the upper limit is violated, an over-correction of spherical aberration would result and the change in aberrations, especially in the distortion accompanying the zooming would exceed the practically tolerable range.

Tables 1 to 5 show the first to fifth embodiments of the present invention corresponding to FIGS. 1, 5, 9, 14 and 19, respectively.

TABLE 1

(Embodiment 1)
$f = 28.5 \sim 35.0 \sim 49.0$    F/2.8    $2\omega = 75° \sim 62° \sim 48°$

| | Radius of Curvature | Axial Distance | Refractive Index | Abbe Number |
|---|---|---|---|---|
| I | $r_1$ 88.532 | $d_1$ 4.50 | $N_1$ 1.60311 | $\nu_1$ 60.7 |
| | $r_2$ 359.143 | $d_2$ 0.18 | | |
| | $r_3$ 42.817 | $d_3$ 1.40 | $N_2$ 1.78850 | $\nu_2$ 45.7 |
| | $r_4$ 18.067 | $d_4$ 8.20 | | |
| | $r_5$ 5611.894 | $d_5$ 1.20 | $N_3$ 1.78831 | $\nu_3$ 47.3 |
| | $r_6$ 38.764 | $d_6$ 3.80 | | |
| | $r_7$ −852.399 | $d_7$ 2.30 | $N_4$ 1.71060 | $\nu_4$ 43.3 |
| | $r_8$ −58.054 | $d_8$ 0.80 | $N_5$ 1.64050 | $\nu_5$ 60.1 |
| | $r_9$ 210.511 | $d_9$ 0.20 | | |
| | $r_{10}$ 32.986 | $d_{10}$ 3.50 | $N_6$ 1.71736 | $\nu_6$ 29.4 |
| | $r_{11}$ 85.544 | $d_{11}$ 18.58~10.28~1.00 | | |
| II | $r_{12}$ 82.430 | $d_{12}$ 2.80 | $N_7$ 1.60000 | $\nu_7$ 64.4 |
| | $r_{13}$ −124.479 | $d_{13}$ 0.10 | | |
| | $r_{14}$ 25.134 | $d_{14}$ 3.36 | $N_8$ 1.60000 | $\nu_8$ 64.4 |
| | $r_{15}$ 74.138 | $d_{15}$ 0.10 | | |
| | $r_{16}$ 29.361 | $d_{16}$ 3.15 | $N_9$ 1.72000 | $\nu_9$ 54.7 |
| | $r_{17}$ 70.717 | $d_{17}$ 4.00 | | |
| | $r_{18}$ −69.099 | $d_{18}$ 2.94 | $N_{10}$ 1.80518 | $\nu_{10}$ 25.4 |
| | $r_{19}$ −28.875 | $d_{19}$ 0.80 | $N_{11}$ 1.75690 | $\nu_{11}$ 29.7 |
| | $r_{20}$ 20.097 | $d_{20}$ 3.92 | | |
| | $r_{21}$ 286.166 | $d_{21}$ 3.85 | $N_{12}$ 1.62280 | $\nu_{12}$ 57.0 |
| | $r_{22}$ −26.711 | $d_{22}$ 1.95~1.0~8.86 | | |
| III | $r_{23}$ 53.036 | $d_{23}$ 2.80 | $N_{13}$ 1.48749 | $\nu_{13}$ 70.1 |
| | $r_{24}$ −78.454 | $d_{24}$ 0.80 | $N_{14}$ 1.63980 | $\nu_{14}$ 34.6 |
| | $r_{25}$ 4230.541 | | | |

$f_I = -36.938$;   $f_{II} = 37.892$;   $f_{III} = 140.140$

TABLE 2

(Embodiment 2)
$f = 24.5 \sim 35.0 \sim 49.0$    F/3.5    $2\omega = 84° \sim 64° \sim 48°$

| | Radius of Curvature | Axial Distance | Refractive Index | Abbe Number |
|---|---|---|---|---|
| | $r_1$ 88.532 | $d_1$ 4.50 | $N_1$ 1.60311 | $\nu_1$ 60.7 |
| | $r_2$ 333.478 | $d_2$ 0.18 | | |
| | $r_3$ 41.242 | $d_3$ 1.40 | $N_2$ 1.78850 | $\nu_2$ 45.7 |
| | $r_4$ 17.833 | | | |

TABLE 2-continued (Embodiment 2)
$f = 24.5 \sim 35.0 \sim 49.0$    F/3.5    $2\omega = 84° \sim 64° \sim 48°$

| | Radius of Curvature | Axial Distance | Refractive Index | Abbe Number |
|---|---|---|---|---|
| | | $d_4$ 8.20 | | |
| | $r_5$ 112.777 | $d_5$ 1.20 | $N_3$ 1.78831 | $\nu_3$ 47.3 |
| I | $r_6$ 27.174 | $d_6$ 3.80 | | |
| | $r_7$ −240.697 | $d_7$ 2.30 | $N_4$ 1.71060 | $\nu_4$ 43.3 |
| | $r_8$ −118.251 | $d_8$ 0.80 | $N_5$ 1.64050 | $\nu_5$ 60.1 |
| | $r_9$ 145.701 | $d_9$ 0.20 | | |
| | $r_{10}$ 30.759 | $d_{10}$ 3.50 | $N_6$ 1.71736 | $\nu_6$ 29.4 |
| | $r_{11}$ 149.922 | $d_{11}$ 24.33~10.32~1.00 | | |
| II | $r_{12}$ 63.142 | $d_{12}$ 2.30 | $N_7$ 1.60000 | $\nu_7$ 64.4 |
| | $r_{13}$ −396.135 | $d_{13}$ 0.10 | | |
| | $r_{14}$ 28.631 | $d_{14}$ 2.80 | $N_8$ 1.60000 | $\nu_8$ 64.4 |
| | $r_{15}$ 67.091 | $d_{15}$ 0.10 | | |
| | $r_{16}$ 24.109 | $d_{16}$ 2.60 | $N_9$ 1.72000 | $\nu_9$ 54.7 |
| | $r_{17}$ 58.240 | $d_{17}$ 4.00 | | |
| | $r_{18}$ −69.197 | $d_{18}$ 2.30 | $N_{10}$ 1.80518 | $\nu_{10}$ 25.4 |
| | $r_{19}$ −25.828 | $d_{19}$ 0.80 | $N_{11}$ 1.75690 | $\nu_{11}$ 29.7 |
| | $r_{20}$ 20.042 | $d_{20}$ 2.40 | | |
| | $r_{21}$ 137.270 | $d_{21}$ 3.30 | $N_{12}$ 1.60000 | $\nu_{12}$ 64.4 |
| | $r_{22}$ −25.178 | $d_{22}$ 1.00~5.97~14.04 | | |
| III | $r_{23}$ 70.276 | $d_{23}$ 2.20 | $N_{13}$ 1.48749 | $\nu_{13}$ 70.1 |
| | $r_{24}$ −70.387 | $d_{24}$ 0.80 | $N_{14}$ 1.63980 | $\nu_{14}$ 34.6 |
| | $r_{25}$ −241.748 | | | |

$f_I = -36.938$;   $f_{II} = 37.892$;   $f_{III} = 134.984$

TABLE 3

(Embodiment 3)
$f = 24.5 \sim 35.0 \sim 49.1$    F/4    $2\omega = 84° \sim 64° \sim 48°$

| | Radius of Curvature | Axial Distance | Refractive Index | Abbe Number |
|---|---|---|---|---|
| I | $r_1$ 88.532 | $d_1$ 4.50 | $N_1$ 1.60311 | $\nu_1$ 60.7 |
| | $r_2$ 370.171 | $d_2$ 0.18 | | |
| | $r_3$ 53.947 | $d_3$ 1.40 | $N_2$ 1.78850 | $\nu_2$ 45.7 |
| | $r_4$ 19.655 | $d_4$ 8.20 | | |
| | $r_5$ 203.092 | $d_5$ 1.20 | $N_3$ 1.78850 | $\nu_3$ 45.7 |
| | $r_6$ 27.921 | $d_6$ 5.46 | | |
| | $r_7$ 30.078 | $d_7$ 3.50 | $N_4$ 1.75000 | $\nu_4$ 25.1 |
| | $r_8$ 71.061 | $d_8$ 24.08~10.21~1.0 | | |
| II | $r_9$ 61.542 | $d_9$ 2.64 | $N_5$ 1.60311 | $\nu_5$ 60.7 |
| | $r_{10}$ −101.673 | $d_{10}$ 0.10 | | |
| | $r_{11}$ 22.820 | $d_{11}$ 3.11 | $N_6$ 1.60311 | $\nu_6$ 60.7 |
| | $r_{12}$ 58.318 | $d_{12}$ 3.35 | | |
| | $r_{13}$ 30.599 | $d_{13}$ 2.00 | $N_7$ 1.72000 | $\nu_7$ 50.3 |

TABLE 3-continued (Embodiment 3)
$f = 24.5 \sim 35.0 \sim 49.1$    F/4    $2\omega = 84° \sim 64° \sim 48°$

| | Radius of Curvature | Axial Distance | Refractive Index | Abbe Number |
|---|---|---|---|---|
| | $r_{14}$ 59.932 | | | |
| | | $d_{14}$ 2.00 | | |
| | $r_{15}$ −52.467 | | | |
| | | $d_{15}$ 2.80 | $N_8$ 1.74000 | $\nu_8$ 28.3 |
| | $r_{16}$ 21.308 | | | |
| | | $d_{16}$ 2.10 | | |
| | $r_{17}$ −817.734 | | | |
| | | $d_{17}$ 3.40 | $N_9$ 1.56567 | $\nu_9$ 43.0 |
| | $r_{18}$ −21.194 | | | |
| | | $d_{18}$ 3.57∼8.75∼17.49 | | |
| III | $r_{19}$ 48.178 | | | |
| | | $d_{19}$ 3.52 | $N_{10}$ 1.60311 | $\nu_{10}$ 60.7 |
| | $r_{20}$ −74.152 | | | |
| | | $d_{20}$ 0.80 | $N_{11}$ 1.64769 | $\nu_{11}$ 33.9 |
| | $r_{21}$ 179.878 | | | |

$f_I = -36.933$;    $f_{II} = 37.892$;    $f_{III} = 118.304$

TABLE 4

(Embodiment 4)
$f = 36.0 \sim 51.6 \sim 68.2$    F/3.5    $2\omega = 62° \sim 46° \sim 35°$

| | Radius of Curvature | Axial Distance | Refractive Index | Abbe Number |
|---|---|---|---|---|
| I | $r_1$ 241.252 | | | |
| | | $d_1$ 4.20 | $N_1$ 1.66998 | $\nu_1$ 39.2 |
| | $r_2$ −202.850 | | | |
| | | $d_2$ 0.10 | | |
| | $r_3$ −3617.179 | | | |
| | | $d_3$ 2.00 | $N_2$ 1.78831 | $\nu_2$ 47.3 |
| | $r_4$ 27.121 | | | |
| | | $d_4$ 9.93 | | |
| | $r_5$ 31.809 | | | |
| | | $d_5$ 3.30 | $N_3$ 1.80518 | $\nu_3$ 25.4 |
| | $r_6$ 43.503 | | | |
| | | $d_6$ 39.46∼14.69∼0.7 | | |
| II | $r_7$ 39.369 | | | |
| | | $d_7$ 4.50 | $N_4$ 1.67790 | $\nu_5$ 53.4 |
| | $r_8$ 1.799.033 | | | |
| | | $d_8$ 0.15 | | |
| | $r_9$ 27.633 | | | |
| | | $d_9$ 3.60 | $N_5$ 1.67000 | $\nu_5$ 57.1 |
| | $r_{10}$ 81.582 | | | |
| | | $d_{10}$ 5.00 | | |
| | $r_{11}$ −95.559 | | | |
| | | $d_{11}$ 3.74 | $N_6$ 1.75000 | $\nu_6$ 25.1 |
| | $r_{12}$ 24.342 | | | |
| | | $d_{12}$ 3.00 | | |
| | $r_{13}$ 321.805 | | | |
| | | $d_{13}$ 3.20 | $N_7$ 1.77551 | $\nu_7$ 37.9 |
| | $r_{14}$ −40.404 | | | |
| | | $d_{14}$ 4.65∼7.50∼10.84 | | |
| III | $r_{15}$ 107.066 | | | |
| | | $d_{15}$ 3.00 | $N_8$ 1.51680 | $\nu_8$ 64.1 |
| | $r_{16}$ ∞ | | | |

$f_I = -69.935$;    $f_{II} = 48.544$;    $f_{III} = 207.171$

TABLE 5

(Embodiment 5)
$f = 24.5 \sim 35.0 \sim 49.1$    F/4    $2\omega = 84° \sim 64° \sim 47°$

| | Radius of Curvature | Axial Distance | Refractive Index | Abbe Number |
|---|---|---|---|---|
| I | $r_1$ 88.532 | | | |
| | | $d_1$ 4.50 | $N_1$ 1.60311 | $\nu_1$ 60.7 |
| | $r_2$ 292.799 | | | |
| | | $d_2$ 0.18 | | |
| | $r_3$ 39.109 | | | |
| | | $d_3$ 1.40 | $N_2$ 1.78850 | $\nu_2$ 45.7 |
| | $r_4$ 18.799 | | | |
| | | $d_4$ 8.20 | | |
| | $r_5$ 268.430 | | | |
| | | $d_5$ 1.20 | $N_3$ 1.78850 | $\nu_3$ 45.7 |
| | $r_6$ 28.012 | | | |
| | | $d_6$ 7.38 | | |

TABLE 5-continued (Embodiment 5)
$f = 24.5 \sim 35.0 \sim 49.1$    F/4    $2\omega = 84° \sim 64° \sim 47°$

| | Radius of Curvature | Axial Distance | Refractive Index | Abbe Number |
|---|---|---|---|---|
| | $r_7$ 30.420 | | | |
| | | $d_7$ 3.50 | $N_4$ 1.75000 | $\nu_4$ 25.1 |
| | $r_8$ 57.900 | | | |
| | | $d_8$ 24.13∼10.24∼1.00 | | |
| II | $r_9$ 62.519 | | | |
| | | $d_9$ 2.30 | $N_5$ 1.60311 | $\nu_5$ 60.7 |
| | $r_{10}$ −258.303 | | | |
| | | $d_{10}$ 0.10 | | |
| | $r_{11}$ 28.882 | | | |
| | | $d_{11}$ 2.80 | $N_6$ 1.60311 | $\nu_6$ 60.7 |
| | $r_{12}$ 64.292 | | | |
| | | $d_{12}$ 0.10 | | |
| | $r_{13}$ 24.409 | | | |
| | | $d_{13}$ 2.60 | $N_7$ 1.74250 | $\nu_7$ 52.5 |
| | $r_{14}$ 60.125 | | | |
| | | $d_{14}$ 4.00 | | |
| | $r_{15}$ −75.340 | | | |
| | | $d_{15}$ 2.30 | $N_8$ 1.80518 | $\nu_8$ 25.4 |
| | $r_{16}$ −24.909 | | | |
| | | $d_{16}$ 0.80 | $N_9$ 1.75690 | $\nu_9$ 29.7 |
| | $r_{17}$ 19.844 | | | |
| | | $d_{17}$ 2.40 | | |
| | $r_{18}$ 331.597 | | | |
| | | $d_{18}$ 3.30 | $N_{10}$ 1.60000 | $\nu_{10}$ 64.4 |
| | $r_{19}$ −25.033 | | | |
| | | $d_{19}$ 1.00∼6.02∼14.30 | | |
| III | $r_{20}$ 55.999 | | | |
| | | $d_{20}$ 2.80 | $N_{11}$ 1.48749 | $\nu_{11}$ 70.1 |
| | $r_{21}$ −51.071 | | | |
| | | $d_{21}$ 1.00 | $N_{12}$ 1.63980 | $\nu_{12}$ 34.6 |
| | $r_{22}$ −306.497 | | | |

$f_I = -36.930$;    $f_{II} = 37.892$;    $f_{III} = 127.913$

In the embodiments, the first and second embodiments in Tables 1 and 2 are especially designed to have a relatively high aperture ratio and a relatively wide maximum field angle.

As is seen from FIGS. 1A, 1B and 1C or FIGS. 5A, 5B and 5C, the wide angle lens system according to the first and second embodiments is characterized in that the first lens group (I) includes at least two positive lens elements and at least two negative lens elements, the second lens group (II) is of the triplet type formed by sandwiching a negative refractive power component ($r_{18}$ to $r_{20}$) in between a pair of positive refractive power components ($r_{12}$ to $r_{17}$ and $r_{21}$ to $r_{22}$) and includes at least four positive lens elements and at least one negative lens element, and the third lens unit (III) includes at least one positive lens element and at least one negative lens element.

Further, the condition (1) is modified as follows:

$$2.5 < f_{III}/f_{II} < 4.0 \tag{1'}$$

and the following two conditions are added:

$$1.0 < |f_{II}/f_I| < 1.5 \tag{2}$$

$$4.5 < D_L/D_S < 19.0 \tag{3}$$

wherein:
$f_I$ represents the focal length of the first lens group;
$D_L$ represents the air space between the second lens group and third lens unit for the longest focal length; and
$D_S$ represents the air space between the second lens group and third lens unit for the shortest focal length.

Condition (2) is to increase the aperture ratio of the lens system to obtain a high speed lens. If the lower limit is violated, the correction of the spherical aberration under the desired aperture ratio is not possible especially at the minimum field angle in the zoom range since the refractive power of the second lens group (II) is excessively great to cause an extremely small value for the f number of the second lens group (II) itself. On the other hand, if the upper limit is violated, the increased negative distortion of the first lens group (I) can no longer be cancelled with the positive distortion of the second lens group (II) although an issue of the correction of spherical aberration may not be raised in this case.

The modified condition (1') which has generally a similar meaning as the original is, in detail, for obtaining a high speed such as F/2.8 or F/3.5 by means of correcting spherical aberration in cooperation with condition (2).

Condition (3) is for restraining any changes in astigmatism, field curvature and distortion accompanying the change during focal length in zooming with the total length of the lens system reduced for compactness. If the lower limit is violated, the positive deviation of the field curvature would be made serious for the longest focal length and the total length of the lens system would be extremely increased. On the other hand, the field curvature, which is negatively deviated for the longest focal length, would be gradually deviated to the positive side in accordance with the zooming and finally show a remarkable positive deviation especially on the sagittal surface at the shortest focal length to cause a deterioration of the image, definition and contrast in the zonal to marginal areas if the upper limit of condition (3) is violated.

Figure 1B:
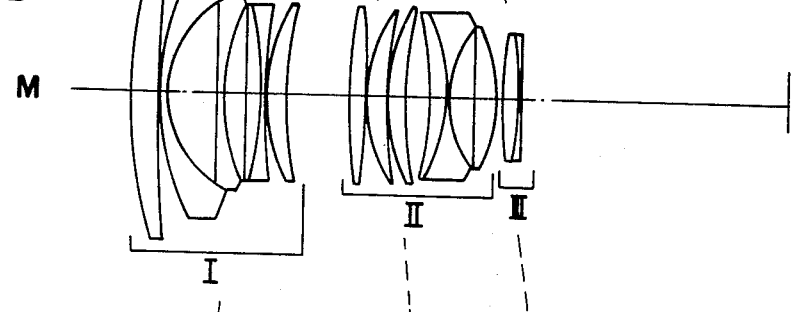
Figure 1C:
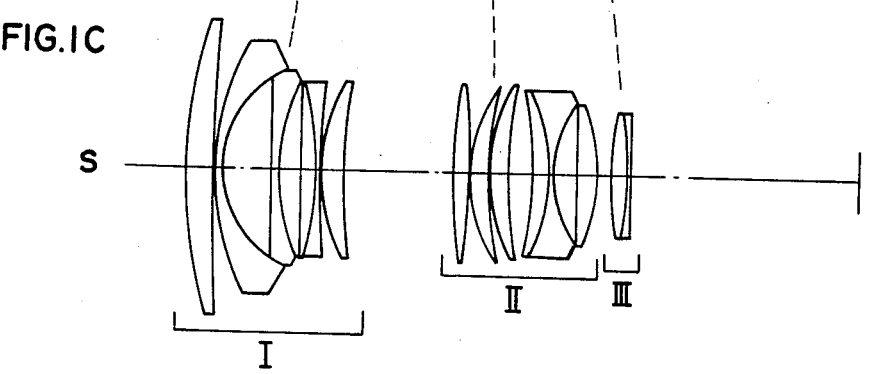

FIGS. 1A, 1B and 1C represent the first embodiment for the longest (L), medium (M) and shortest (S) focal lengths, respectively. The broken lines between the Figures are for illustration to roughly understand the relative movements of the three lens groups.

Figure 2A:
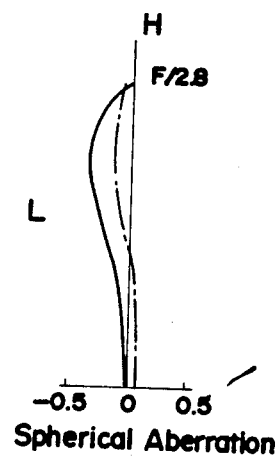
FIGS. 2A, 2B and 2C represent graphic plots of the aberrations of the first embodiment for the longest focal length.
Figure 2B:
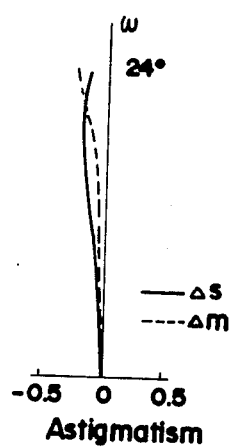
Figure 2C:
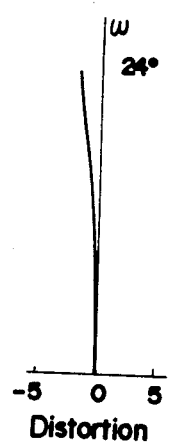
Figure 3A:
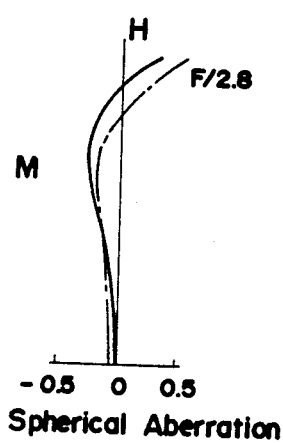
FIGS. 3A, 3B and 3C represent graphic plots of the aberrations of the first embodiment for the medium focal length.
Figure 3B:
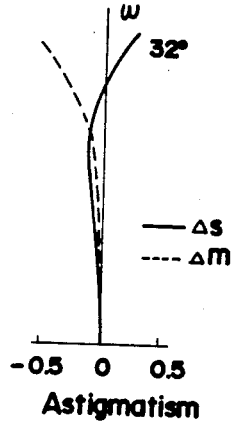
Figure 3C:
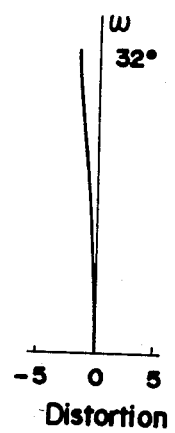
Figure 4A:
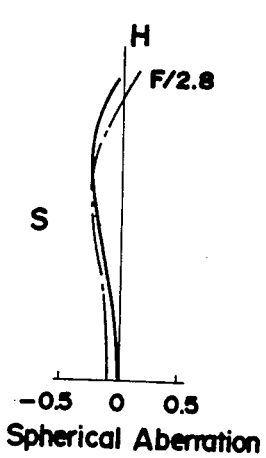
FIGS. 4A, 4B and 4C represent graphic plots of the aberrations of the first embodiment for the shortest focal length.
Figure 4B:
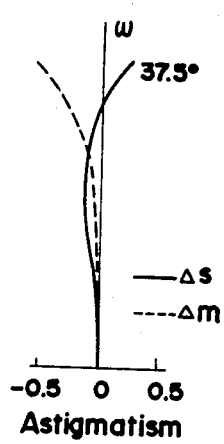
Figure 4C:
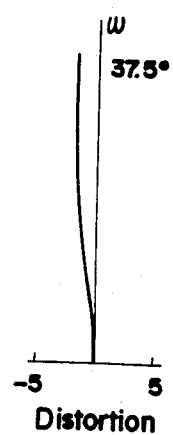
Figure 5A:
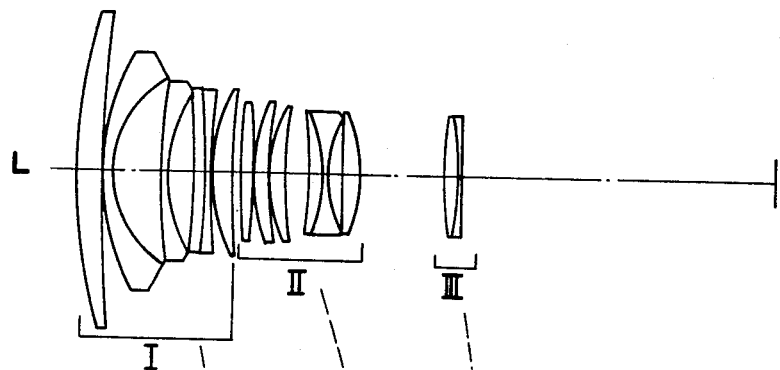
FIGS. 5A, 5B and 5C represent schematic cross sectional views in various focal lengths of a second embodiment of the present invention.
Figure 5B:
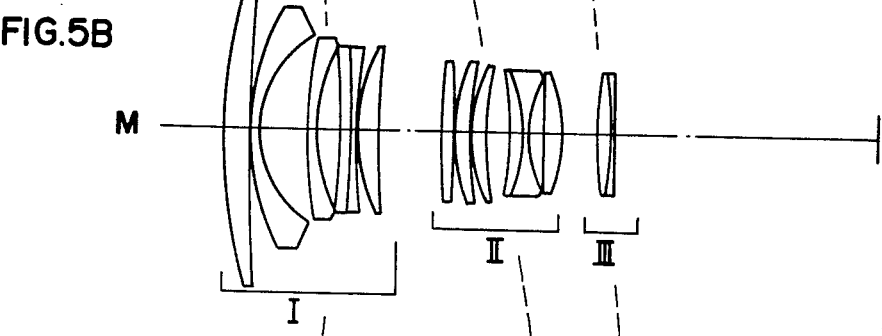
Figure 5C:
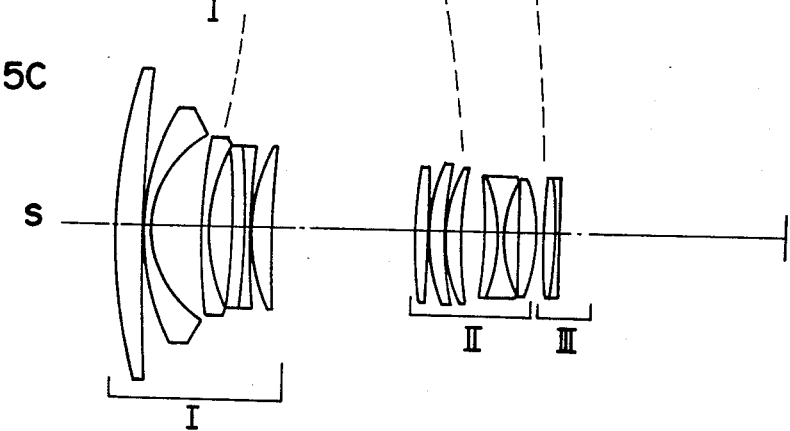
Figure 6A:
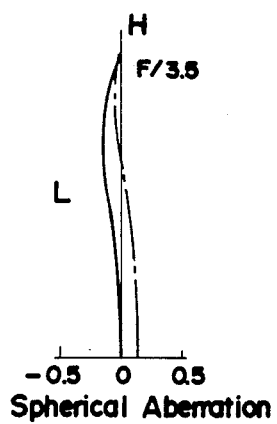
FIGS. 6A, 6B and 6C represent graphic plots of the aberrations of the second embodiment for the longest focal length.
Figure 6B:
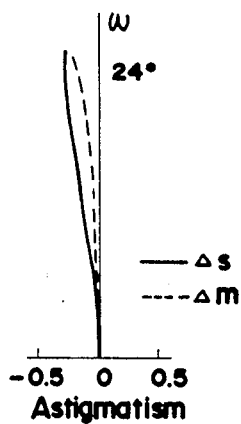
Figure 6C:
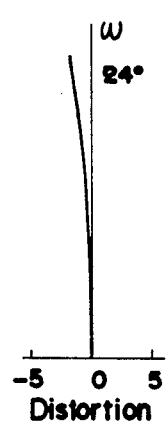
Figure 7A:
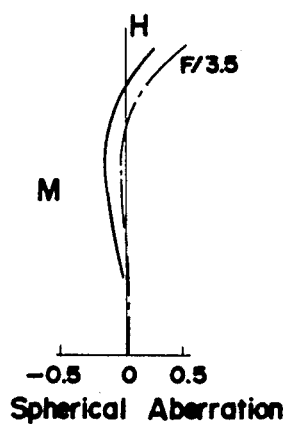
FIGS. 7A, 7B and 7C represent graphic plots of the aberrations of the second embodiment for the medium focal length.
Figure 7B:
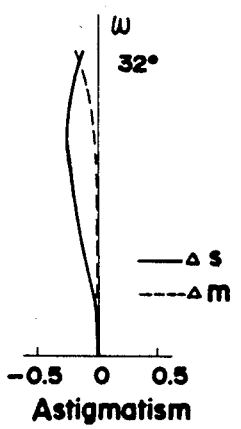
Figure 7C:
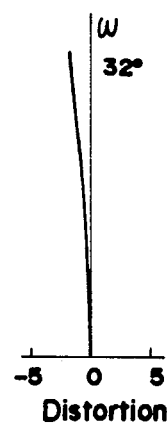
Figure 8A:
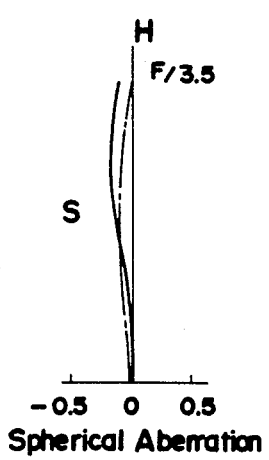
FIGS. 8A, 8B and 8C represent graphic plots of the aberrations of the second embodiment for the shortest focal length.
Figure 8B:
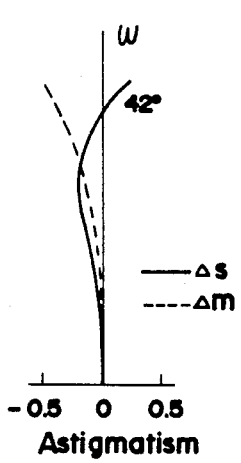
Figure 8C:
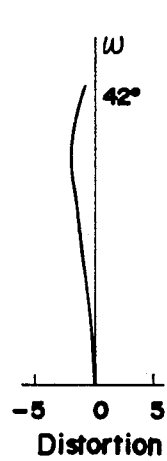
Figure 12A:
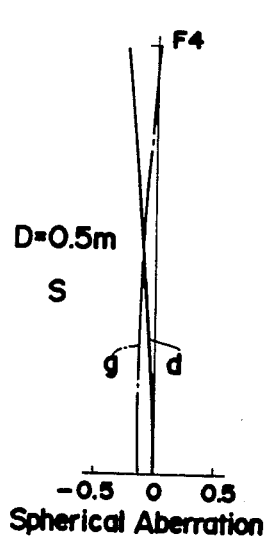
FIGS. 12A, 12B and 12C represent graphic plots of the aberrations of the third embodiment for the shortest focal length in close focusing.
Figure 12B:
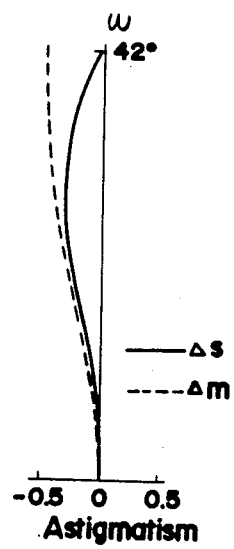
Figure 12C:
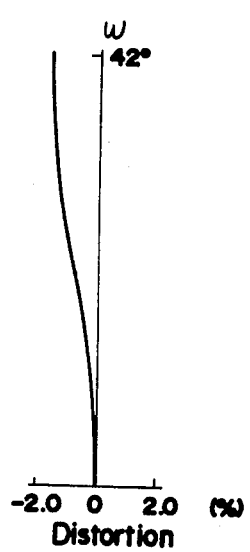
Figure 13A:
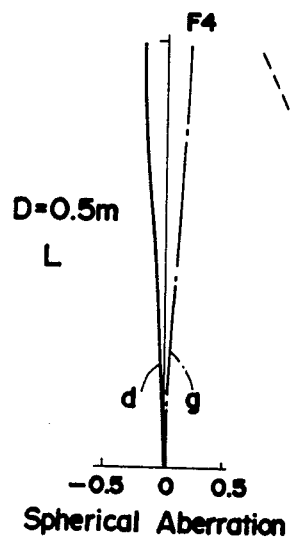
FIGS. 13A, 13B and 13C represent graphic plots of the aberrations of the third embodiment for the longest focal length in close focusing.
Figure 13B:
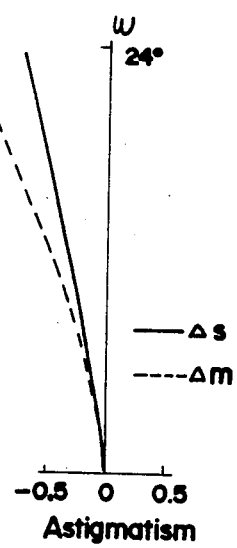
Figure 13C:
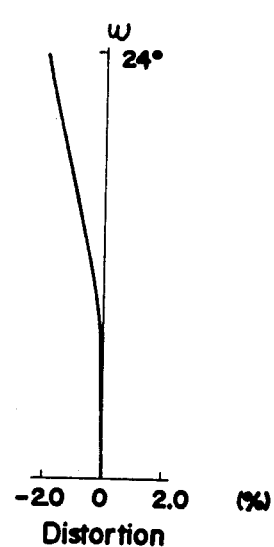
Figure 14A:
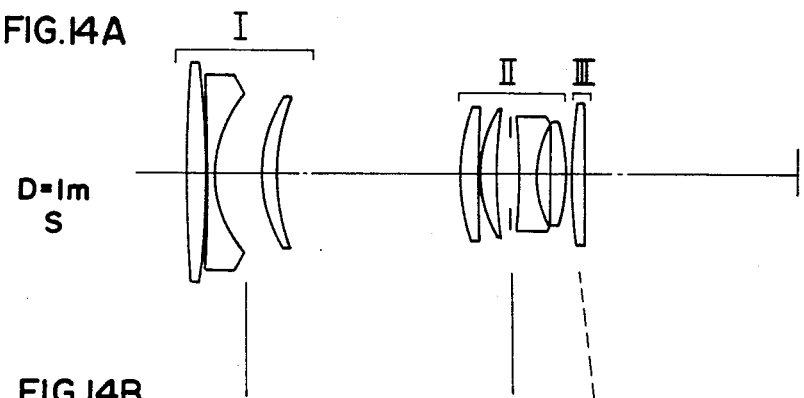
FIGS. 14A, 14B, 14C and 14D represent schematic cross sectional views in various focal lengths of a fourth embodiment of the present invention.
Figure 14B:
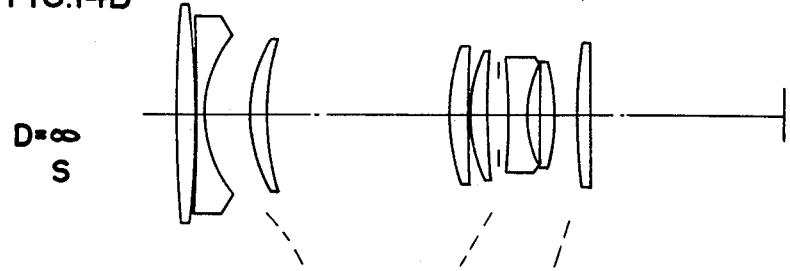
Figure 14C:
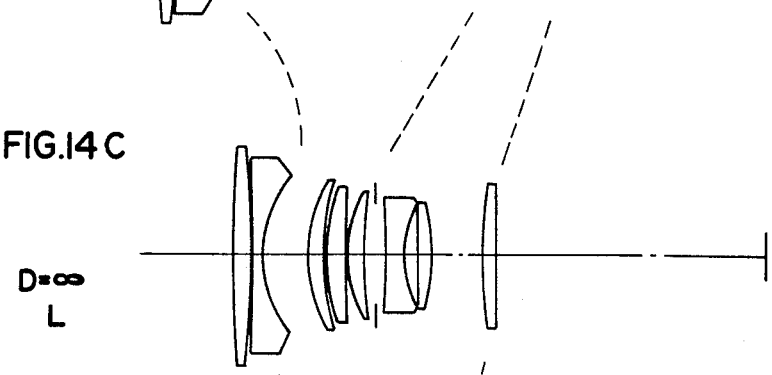
Figure 14D:
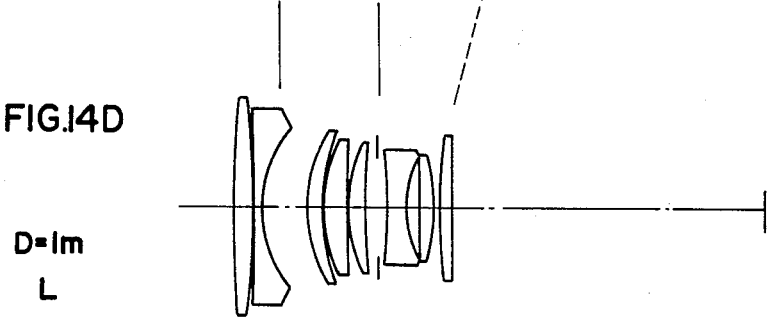
Figure 15A:
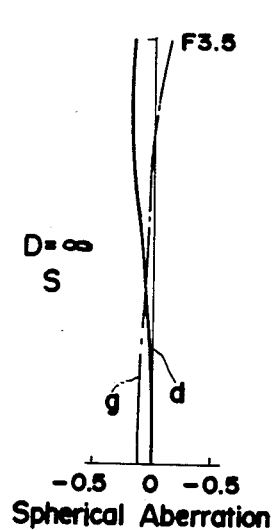
FIGS. 15A, 15B and 15C represent graphic plots of the aberrations of the fourth embodiment for the shortest focal length.
Figure 15B:
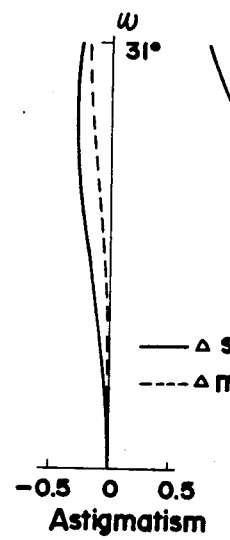
Figure 15C:
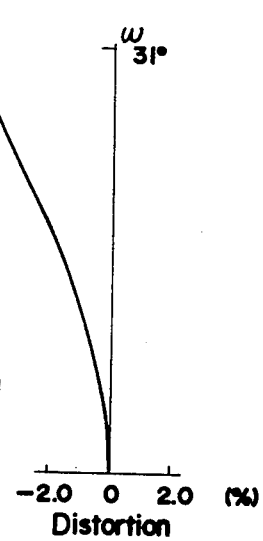
Figure 16A:
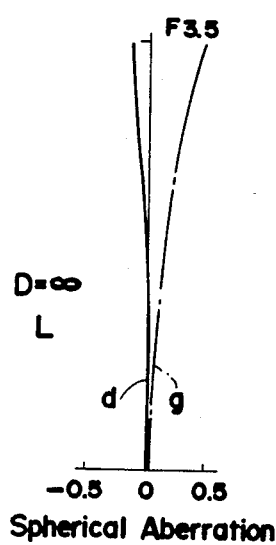
FIGS. 16A, 16B, and 16C represent graphic plots of the aberrations of the fourth embodiment for the longest focal length.
Figure 16B:
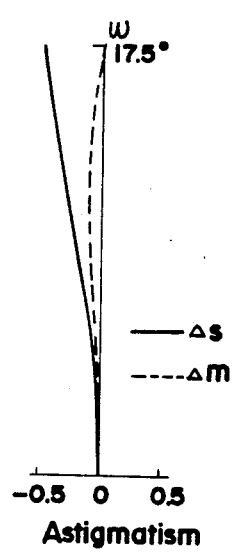
Figure 16C:
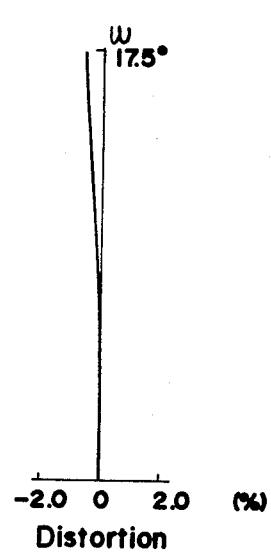
Figures 17A, 17B, 17C:
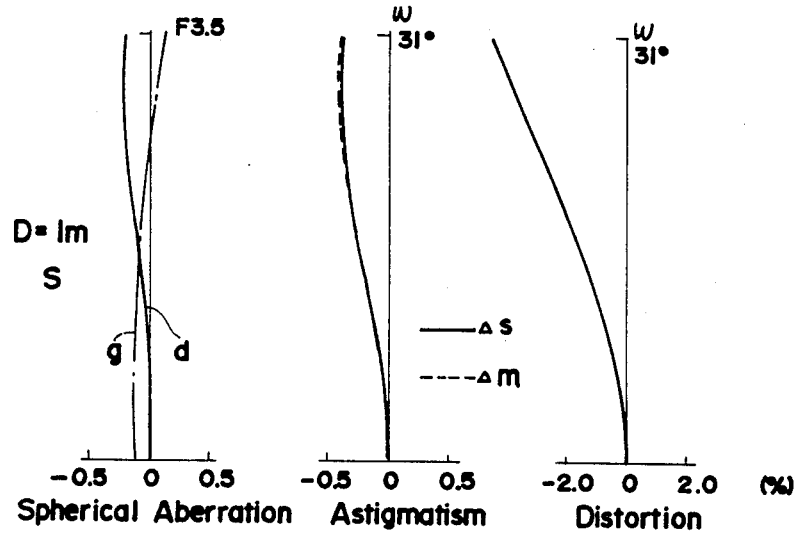
FIGS. 17A, 17B and 17C represent graphic plots of the aberrations of the fourth embodiment for the shortest focal length in close focusing.
Figures 18A, 18B, 18C:
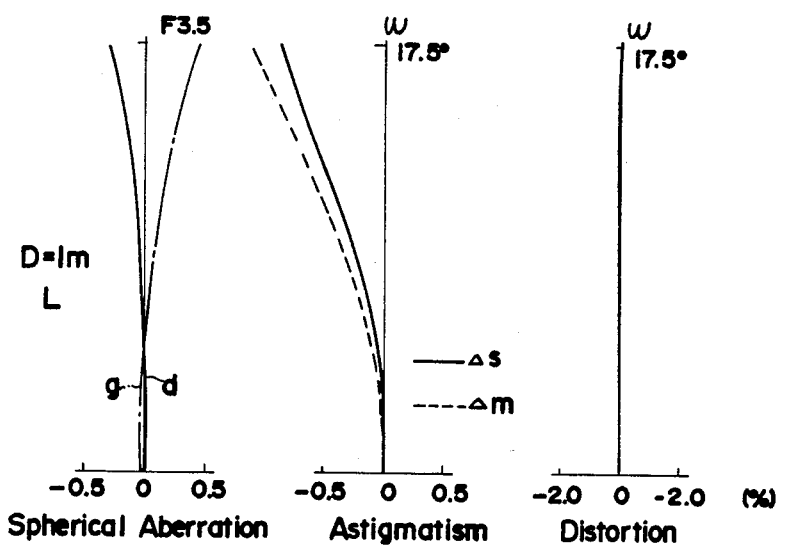
FIGS. 18A, 18B and 18C represent graphic plots of the aberrations of the fourth embodiment for the longest focal length in close focusing.

From the aberration curves in FIGS. 2C, 3C and 4C, it is apparent that any change in distortion during the zooming mode, which is inherent in wide angle zoom lens systems, is restrained within about 1 percent in the first embodiment. As to the value itself of the distortion, although about −2 percent is tolerated in view of the balance with the corrections for other aberrations, this value is considerably superior to the general standard of the tolerable distortion for a non-variable focal length wide angle lens system, i.e. −3 percent. In addition, other aberrations are satisfactory in view of both the individual values for various focal lengths and their relative changes due to the change in the focal length as seen in the aberration curves relating to the first embodiment. Thus the first embodiment achieves an aperture ratio, F/2.8 and a maximum field angle, 75 degrees.

FIGS. 5A to 8C relating to the second embodiment can be understood in a similar manner, and will not require additional explanation except that the second embodiment achieves an aperture ratio of F/3.5 for a maximum field angle of 84 degrees.

With respect to focusing in the first and second embodiments, the axial movement of the first lens group (I) is utilizable as in an ordinary two-group type wide angle zoom lens system.

On the contrary, the third and fourth embodiments in Tables 3 and 4 are to provide a novel focusing system. In other words, in the third and fourth embodiments of the present invention, the air space between the first and second lens groups for the shortest focal length is greater than that for the longest focal length and the air space between the second lens group and third lens groups for the shortest focal length is less than that for the longest focal length as is understood from FIGS. 9B and 9C or FIGS. 14B and 14C. The third lens group (III) is movable along the optical axis with the first and second lens groups left stationary for focusing as shown in FIGS. 9B to 9A, FIGS. 9C to 9D, FIGS. 14B to 14A and FIGS. 14C to 14D. Solid lines between the Figures denote that the lens groups are left stationary. Further, the lens system according to the third and fourth embodiments fulfills the following conditions in addition to the condition (1):

$$0.05 f_S < D_S < 0.25 f_S \quad (4)$$

$$0.1 f_L < D_L < 0.5 f_L \quad (5)$$

wherein:
$f_S$ represents the shortest focal length of the whole lens system; and
$f_L$ represents the longest focal length of the whole lens system.

According to the general feature of the present invention that the refractive power of the third lens unit (III) is sufficiently less than that of the second lens group (II), the third lens unit (III) can consist of a simple construction, e.g., one single lens element or one cemented doublet. Such a simple construction is suitable for focusing by means of its axial movement as in the third and fourth embodiments.

Condition (1) viewed from focusing by means of the axial movement of the third lens group (III) involves the following meaning. Namely, condition (1) can also be interpreted to define the refractive power of the third lens unit (III) relative to that of the second lens group (II) within a range suitable for practical focusing. If the lower limit of condition (1) is violated the refractive power of the third lens unit (III) would be too great to form the third lens unit (III) by a simple construction. On the contrary, the excessively small refractive power resulting from the violation of the upper limit of condition (1) would require an unrealistically excessive movement of the third lens unit for achieving the focusing to the desired object.

Conditions (4) and (5) are correlative with condition (1) and define the air space ($D_S$) between the second lens group and third lens unit in the infinity focusing for the shortest focal length and the air space ($D_L$) between the second lens group and third lens unit in the infinity focusing for the longest focal length. In other words, conditions (4) and (5) define the practical spaces for the movement of the third lens unit (III) toward the object side since the third lens unit (III) has to move toward the object side for focusing a closer object because of its positive refractive power. If any one of the lower limits of conditions (4) and (5) is violated, it would be impossible to reduce the minimum object distance to a desired value unless the refractive power of the third lens group is increased beyond the limit. The upper limits of conditions (4) and (5) are necessary to obtain a sufficiently great back focal distance with a physical compactness of the lens system maintained. Further, condition (4) and (5) are effective to restrict within a tolerable range the changes in field curvature and distortion during the zooming.

With respect to the third embodiment, the third lens unit (III) is moved toward the object side by 8.44 mm to focus the object distance of D=0.5 m for the longest focal length, which corresponds to the movement from FIGS. 9C to 9D. On the other hand, the corresponding value of movement of the third lens group (III) for the shortest focal length is 2.67 mm, which is identical with the movement from FIGS. 9B to 9A. FIGS. 10, 11, 12 and 13 are aberration curves a third embodiment in various positions corresponding to FIGS. 9B, 9C, 9A and 9D, respectively.

As to the fourth embodiment the movements of the third lens group (III) to focus the object distance of D=1 m are 9.84 mm and 3.61 mm for the longest and shortest focal lengths, respectively. FIGS. 14A to 18C, which relate to the fourth embodiment, are to be understood in a similar manner as in the Figures relating to the third embodiment.

According to present invention, the rear lens group of the conventional two-group type zoom lens system is divided into the second lens group (II) of a greater refractive power and the third lens unit (III) of a less refractive power, and the air space between them is increased in response to the increase of the focal length. This feature is effective to increase the total focal length of the whole second lens group and third lens unit for a longer focal length setting during zooming. This means that the aperture ratio is decreased to loosen the tolerance to manufacturing error, especially of the second lens group. Thus, the refractive powers of the lens groups can more easily be increased to make the whole lens system compact and light weight. Further, the above feature of the second and third lens groups are effective to restrain, during the zooming, the changes in aberrations which are serious in the conventional two group type zoom lens system.

Further, according to the specific feature of the third and fourth embodiments of the present invention that the lens group to be moved for focusing is of a simple and light weight type and located at the image side end of the whole lens system, a focus control by means of a power source built inside the camera body is also possible. In other words, the third lens unit (III) of the present invention can be easily driven by a motor or the like mounted inside the camera body and controlled by an electric focus control signal, such as in an automatic focus control camera. This is because the location of the third lens unit (III) according to the present invention will be quite close to the driving power source in the camera body to require only a simple interconnecting mechanism for the necessary lens driving, and the compact and light weight third lens unit (III) of the present invention will only be a little load on the driving power source, such as a motor to save the consumption of the electric power, which is generally derived from a built-in battery of a relatively small capacity in view of the total compactness of the camera.

With respect to the focusing of the third and fourth embodiments, it should be noted that the degree of movement of the third lens unit (III) required to focus an identical object distance differs in accordance with the focal length. However, this causes no problem provided that the third lens unit (III) is driven under the control of an electric signal, since any difference in the degree of movement can be compensated by means of an electric circuitry for generating the electric control signal. The difference of the degree of movement is rather favorable to make the whole lens system compact because the movements of the lens elements are well harmonized between zooming and focusing. Namely, the air space between the second lens group and third lens unit is relatively greater when the focal length is relatively greater as in FIGS. 14B and 14C, which is suitable for the fact that the degree of the movement toward the object side necessary for the third lens unit (III) to focus an identical object distance is relatively greater when the focal length is relatively greater as is understood by comparing the change from FIGS. 14B to 14A with that from FIGS. 14C to 14D.

Thus, the lens system according to the third and fourth embodiment has various advantages, which includes compactness, light weight, the generous tolerance to manufacturing error, aberration correction, and the applicability to an automatic focus control camera.

The fifth embodiment of the present invention in Table 5 is characterized by its macrophotography capability. Namely, in the fifth embodiment of the present invention, the air space between the first and second lens groups for the shortest focal length is greater than that for the longest focal length and the air space between the second lens group and third lens unit for the shortest focal length is less than that for the longest focal length as is apparent from FIGS. 19A, 19B and 19C. Further, the first lens group (I) is movable along the optical axis with the second lens group and third lens unit left stationary for focusing in the ordinary object distance range as shown in the movement from FIG. 19C to FIG. 19D, and the third lens unit, (III) is movable toward the object side along the optical axis for macro focusing with the first and second lens groups left stationary in the respective positions for the longest focal length as is understood from the movement in FIGS. 19D to 19E.

In general, focusing in the zoom lens system is realized by means of moving the front lens group. However, the minimum object distance capable of being focused by such a zoom lens system is relatively greater than that of a nonvariable focal length lens system since the problems of the relatively complex lens barrel mechanism, the changes in aberrations due to the zooming and the increase of the diameter of the front lens group interfere with the effort to reduce the minimum object distance to be focused by the zoom lens system. This means that the maximum magnification is relatively small in the zoom lens system. This insufficiency in the minimum object distance and the maximum magnification are more remarkable especially in a relatively wide angle zoom lens system which has a front negative lens group designed to cover a zoom range around the standard field angle or extending to the wide angle.

Therefore, the prior art has been seeking additional means or methods to take a photograph with a reduced object distance or an increased magnification i.e. macrophotography, by means of such a relatively wide angle zoom lens system. As to the conventional two-group type zoom lens system having a negative front lens group and a positive rear lens group, in which the focusing is achieved by axially moving the front lens group toward the object side, several means for macrophotography have been presented. One of them is to further move the front lens group under the condition that the lens system is set to the longest focal length and the front lens group has been moved to a position to focus a minimum object distance in the ordinary object distance range. This method involves a deterioration of aberration correction since the air space between the front and rear lens groups are excessively widened. The spherical aberration flare at the center of the image is especially remarkable in this method of macrophotography. Another method of macrophotography in the prior art is to move the rear lens group toward the object side under the condition that the lens is set to the shortest focal length, which is favorable to the aberration correction since the air space between the front and rear lens groups is to be reduced. The magnification obtainable by this method is, however, not so increased since the macrophotography is practiced under the shortest focal length, although the object distance itself is considerably reduced in this macrophotography method. Therefore, an unsatisfactory close-up photography would be the result.

The effect of the fifth embodiment can be better understood in contrast to the above described circumstance of the prior art. Namely, the fifth embodiment of the present invention is a wide angle zoom lens system capable of macrophotography with a sufficiently great magnification and well corrected aberrations.

In the fifth embodiment, the third lens unit (III) is shifted toward the object side in the longest focal length setting by utilizing the widened air space between the second lens group and third lens unit. This macrofocusing method in the longest focal length setting causes no problem for the aberration correction, shows little change in focal length due to the macrofocusing, and finally obtains a photography with sufficiently great magnification.

Figure 19A:
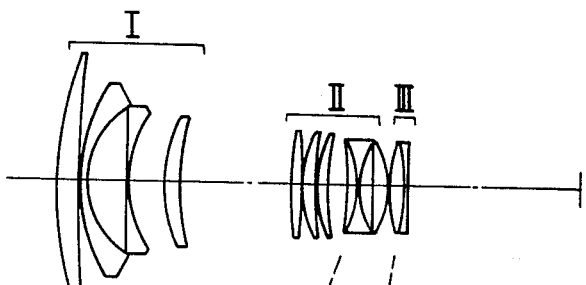
FIGS. 19A, 19B, 19C, 19D and 19E represent schematic cross sectional views in various focal lengths of a fifth embodiment of the present invention.
Figure 19B:
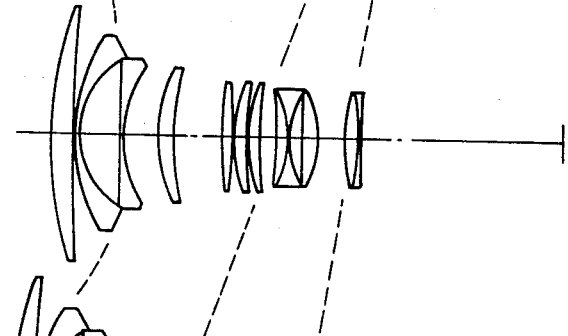
Figure 19C:
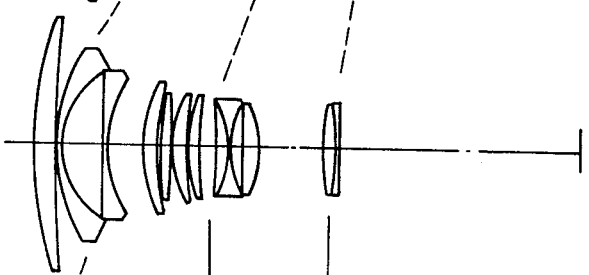
Figure 19D:
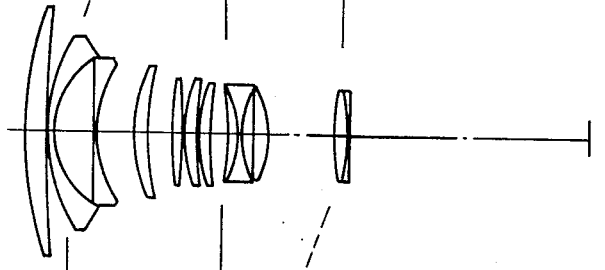
Figure 19E:
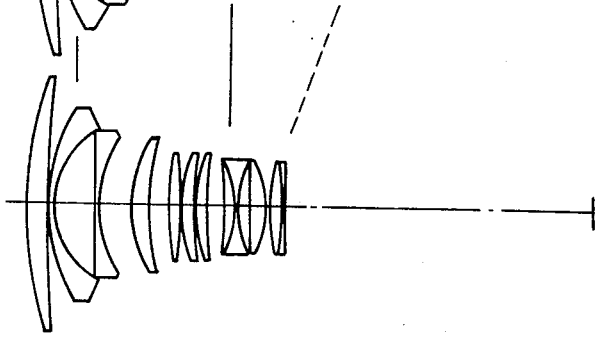

In FIGS. 19A to 19E relating to the fifth embodiment, FIGS. 19A, 19B and 19C correspond to the condition in infinity focusing for the shortest, medium and longest focal lengths, respectively. And, FIG. 19D represents a condition that the first lens group (I) is shifted by 3.22 mm from the condition of FIG. 19C to focus to the object distance of D=0.5 m (magnification, $\beta = -0.12$), which is the minimum object distance in the ordinary object distance range. Finally, FIG. 19E represents the macrophotography, in which the third lens group (III) is shifted by 13.05 mm from the condition in FIG. D to focus the object distance of D=0.25 m with magnification, $\beta = -0.32$.

Figure 20A:
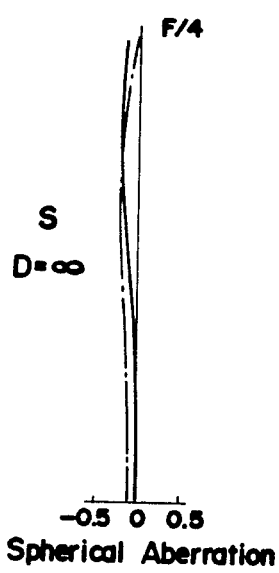
FIGS. 20A, 20B and 20C represent graphic plots of the aberrations of the fifth embodiment for the shortest focal length.
Figure 20B:
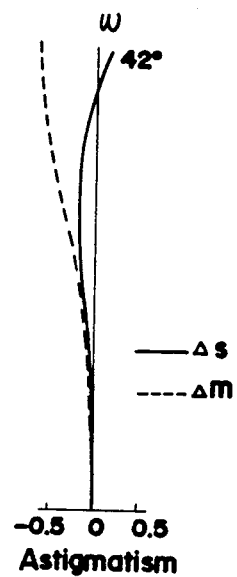
Figure 20C:
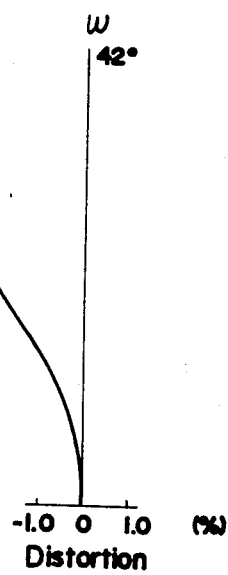
Figure 21A:
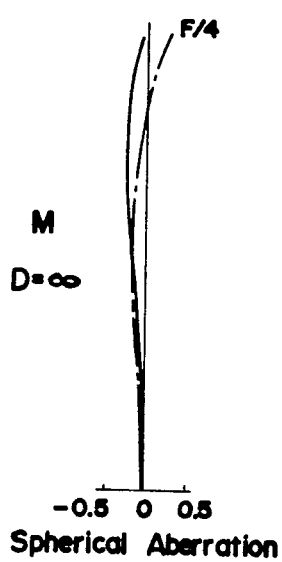
FIGS. 21A, 21B and 21C represent graphic plots of the aberrations of the fifth embodiment for the medium focal length.
Figure 21B:
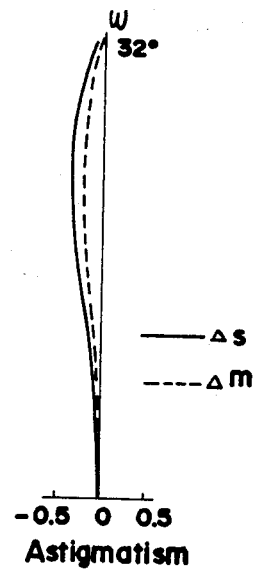
Figure 21C:
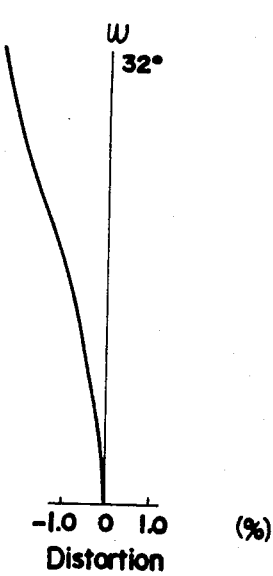
Figure 22A:
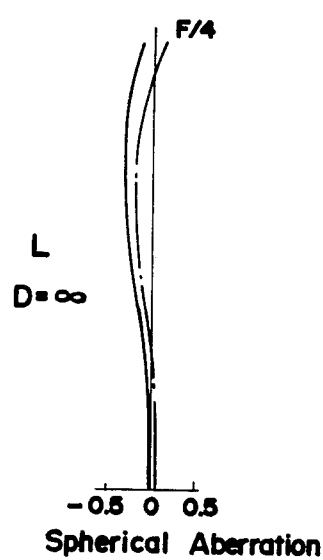
FIGS. 22A, 22B and 22C represent graphic plots of the aberrations of the fifth embodiment for the longest focal length.
Figure 22B:
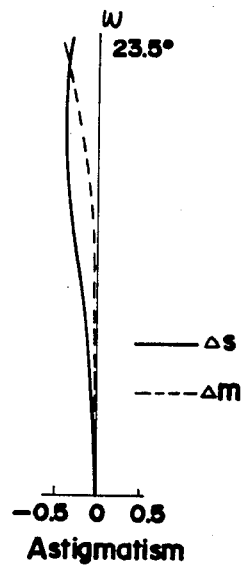
Figure 22C:
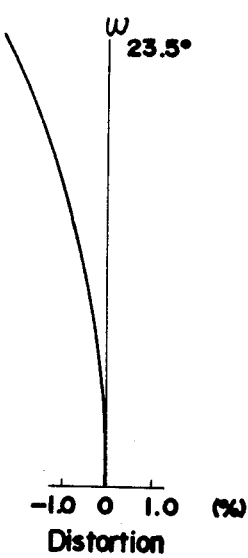
Figure 23A:
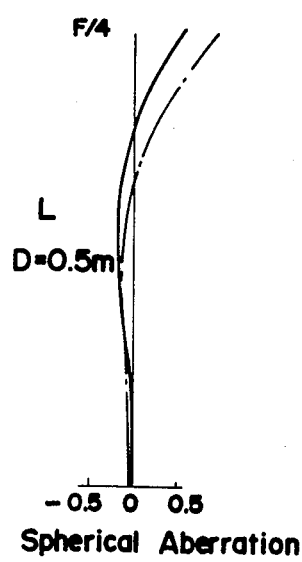
FIGS. 23A, 23B and 23C represent graphic plots of the aberrations of the fifth embodiment for the longest focal length in close focusing.
Figure 23B:
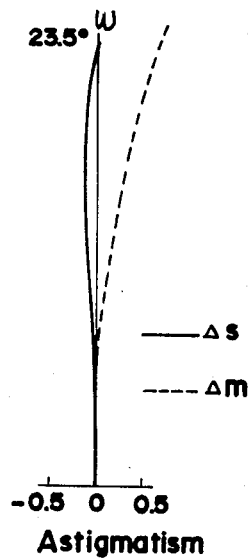
Figure 23C:
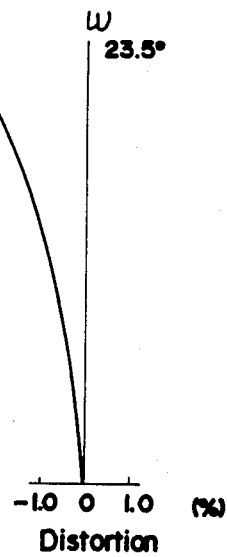

FIGS. 20, 21 and 22 represent aberration curves corresponding to the conditions in FIGS. 19A, 19B and 19C, respectively. FIGS. 23A, 23B and 23C represent the aberration curves for the ordinary focusing in FIG. 19D. Finally, FIGS. 24A, 24B and 24C represent the aberration curves for the macrofocusing corresponding to FIG. 19E, in which well corrected aberrations can be observed.

For reference, FIGS. 25A, 25B annd 25C show aberration curves of the fifth embodiment when the first lens group (I) is further shifted by 4.91 mm toward the object side from the condition in FIG. 19D to focus the object distance of D=0.25 m in place of the movement of the third lens group. The magnification obtainable in this case is $\beta = -0.29$. If FIGS. 24A, 24B and 24C are compared with FIGS. 25A, 25B and 25C, the macrofocusing by the fifth embodiment in FIG. 19E according to the present invention will be fully appreciated in its advantages relating to the corrections of the flare which would appear upon the fully open aperture caused by spherical aberration, the field curvature and the astigmatic distance caused by the off-axial aberrations and the distortion which is conventionally an inherent aberration to macrophotography. This is because the aberrations caused by the movement of the first lens group (I) for ordinary focusing are cancelled by the counter aberrations generated by the movement of the third lens group according to the present invention. Further, the magnification obtainable by focusing an identical object distance, D=0.25 m is greater in the macrophotography in FIG. 19E than that of the reference condition since the change in the focal length of the whole lens system caused by the lens movement for macrofocusing is less in the condition disclosed in FIG. 19E.

According to the present invention, various modifications of the embodiments may be possible. For example, although the third lens unit (III) is moved during zooming in all of the embodimehts, the third lens group unit can be modified to be left stationary in zooming and moved only in focusing or macrofocusing. Or, a total focusing operation from the infinity to the macrophotography range can be possible by only movement of the third lens unit (III) if sufficient air space is still left between the second lens group and third lens unit, even after the third lens unit is moved toward the object side for focusing to the minimum of the ordinary object distance range, to allow an additional movement of the third lens group toward the object side as in FIG. 9D.

While the above embodiments have been disclosed as the best modes presently contemplated by the inventor, it should be realized that these examples should not be interpreted as limiting, because artisans skilled in this field, once given the present teachings, can vary from these specific embodiments.

Accordingly, the scope of the present invention should be determined solely from the following claims, in which I claim:

1. A zoom lens system comprising from the object to the image side:

a first lens group of a negative refractive power including at least two positive lens elements and at least one negative lens element;

a second lens group of a positive refractive power, the second lens group being of the triplet type formed by sandwiching a negative refractive power component in between a pair of positive refractive power components; and a third lens unit of a positive refractive power including at least one positive lens element, wherein an air space between the first and second lens group and an air space between the second lens group and third lens unit are changeable for zooming and the lens system fulfills the following condition:

$$2.5 < f_{III}/f_{II} < 4.5$$

wherein $f_{II}$ and $f_{III}$ represent the focal lengths of the second lens group and third lens unit, respectively.

2. The invention of claim 1, wherein the lens system further fulfills the following condition:

$$1.0 < |f_{II}/f_I| < 1.5$$

wherein $f_I$ represents the focal length of the first lens group.

3. The invention of claim 2, wherein the lens system further fulfills the following conditions:

$$4.5 < D_L/D_S < 19.0$$

$D_L$ represents the air space between the second lens group and third lens unit for the longest focal length; and $D_S$ represents the air space between the second lens group and third lens unit for the shortest focal length.

4. The invention of claim 3, wherein the first mentioned condition is as follows:

$$2.5 < f_{III}/f_{II} < 4.0$$

5. The invention of claim 1, wherein the air space between the first and second lens groups for the shortest focal length is greater than that for the longest focal length and the air space between the second lens groups and third lens unit for the shortest focal length is less than that for the longest focal length.

6. The invention of claim 5, wherein the third lens unit is movable along the optical axis with the first and second lens groups left stationary for focusing.

7. The invention of claim 6, wherein the lens system further fulfills the following conditions:

$$0.05 f_S < D_S < 0.25 f_S$$

$$0.1 f_L < D_L < 0.5 f_L$$

wherein:

$D_S$ represents the air space between the second lens group and third lens unit in the infinity focusing for the shortest focal length;

$D_L$ represents the air space between the second lens group and third lens unit in the infinity focusing for the longest focal length;

$f_S$ represents the shortest focal length of the whole lens system; and $f_L$ represents the longest focal length of the whole lens system.

8. The invention of claim 5, wherein the first lens group is movable along the optical axis with the second lens group and third lens units left stationary for focusing in the ordinary object distance range, and wherein the third lens unit is movable toward the object side along the optical axis for macro focusing with the first and second lens groups left stationary in the respective positions for the longest focal length.

9. The invention of claim 1, wherein the third lens unit consists of a positive single lens element.

10. The invention of claim 1, wherein the third lens unit consists of a doublet formed by cementing a negative lens element to the positive lens element.

11. A wide angle zoom lens system comprising the following data:

| | Radius of Curvature | Axial Distance | Refractive Index | Abbe Number |
|---|---|---|---|---|
| | \multicolumn{4}{l}{$f = 28.5 \sim 35.0 \sim 49.0$   F/2.8   $2\omega = 75° \sim 62° \sim 48°$} | | | |
| I | $r_1$ 88.532 | | | |
| | | $d_1$ 4.50 | $N_1$ 1.60311 | $\nu_1$ 60.7 |
| | $r_2$ 359.143 | | | |
| | | $d_2$ 0.18 | | |
| | $r_3$ 42.817 | | | |
| | | $d_3$ 1.40 | $N_2$ 1.78850 | $\nu_2$ 45.7 |
| | $r_4$ 18.067 | | | |
| | | $d_4$ 8.20 | | |
| | $r_5$ 5611.894 | | | |
| | | $d_5$ 1.20 | $N_3$ 1.78831 | $\nu_3$ 47.3 |
| | $r_6$ 38.764 | | | |
| | | $d_6$ 3.80 | | |
| | $r_7$ −852.399 | | | |

-continued

| | Radius of Curvature | Axial Distance | Refractive Index | Abbe Number |
|---|---|---|---|---|
| | $r_8$ −58.054 | | | |
| | | $d_7$ 2.30 | $N_4$ 1.71060 | $\nu_4$ 43.3 |
| | $r_9$ 210.511 | | | |
| | | $d_8$ 0.80 | $N_5$ 1.64050 | $\nu_5$ 60.1 |
| | | $d_9$ 0.20 | | |
| | $r_{10}$ 32.986 | | | |
| | | $d_{10}$ 3.50 | $N_6$ 1.71736 | $\nu_6$ 29.4 |
| | $r_{11}$ 85.544 | | | |
| | | $d_{11}$ 18.58~10.28~1.00 | | |
| II | $r_{12}$ 82.430 | | | |
| | | $d_{12}$ 2.80 | $N_7$ 1.60000 | $\nu_7$ 64.4 |
| | $r_{13}$ −124.479 | | | |
| | | $d_{13}$ 0.10 | | |
| | $r_{14}$ 25.134 | | | |
| | | $d_{14}$ 3.36 | $N_8$ 1.60000 | $\nu_8$ 64.4 |
| | $r_{15}$ 74.138 | | | |
| | | $d_{15}$ 0.10 | | |
| | $r_{16}$ 29.361 | | | |
| | | $d_{16}$ 3.15 | $N_9$ 1.72000 | $\nu_9$ 54.7 |
| | $r_{17}$ 70.717 | | | |
| | | $d_{17}$ 4.00 | | |
| | $r_{18}$ −69.099 | | | |
| | | $d_{18}$ 2.94 | $N_{10}$ 1.80518 | $\nu_{10}$ 25.4 |
| | $r_{19}$ −28.875 | | | |
| | | $d_{19}$ 0.80 | $N_{11}$ 1.75690 | $\nu_{11}$ 29.7 |
| | $r_{20}$ 20.097 | | | |
| | | $d_{20}$ 3.92 | | |
| | $r_{21}$ 286.166 | | | |
| | | $d_{21}$ 3.85 | $N_{12}$ 1.62280 | $\nu_{12}$ 57.0 |
| | $r_{22}$ −26.711 | | | |
| | | $d_{22}$ 1.95~1.0~8.86 | | |
| III | $r_{23}$ 53.036 | | | |
| | | $d_{23}$ 2.80 | $N_{13}$ 1.48749 | $\nu_{13}$ 70.1 |
| | $r_{24}$ −78.454 | | | |
| | | $d_{24}$ 0.80 | $N_{14}$ 1.63980 | $\nu_{14}$ 34.6 |
| | $r_{25}$ 4230.541 | | | |

12. A zoom lens system comprising from the object to the image side:

a first lens group of a negative refractive power including at least one positive lens element and at least one negative lens element;

a second group of a positive refractive power, the second lens group being of a triplet type formed by sandwiching a negative refractive power component in between a pair of positive refractive power components; and a third lens unit of a positive refractive power including at least one positive lens element, an air space between the first and second lens groups and an air space between the second lens group and third lens unit being changeable for zooming, wherein the air space between the first and second lens groups for the shortest focal length is greater than that for the longest focal length, and the air space between the second lens group and third lens unit for the shortest focal length is less than that for the longest focal length, wherein the first lens group is movable along the optical axis with the second lens group and the third lens unit left stationary for focusing in the ordinary object distance range, and wherein the third lens unit is movable toward the object side along the optical axis for macrofocusing with the first and second lens groups left stationary in their respective positions for the longest focal length and wherein the lens system fulfills the following condition:

$$2.5 < f_{III}/f_{II} < 4.5$$

wherein $f_{II}$ and $f_{III}$ represent the focal lengths of the second lens group and the third lens unit, respectively.

13. A zoom lens system comprising from the object to the image side:
- a first lens group of a negative refractive power including at least one positive lens element and at least one negative lens element;
- a second group of a positive refractive power, the second lens group being of a triplet type formed by sandwiching a negative refractive power component in between a pair of positive refractive power components; and
- a third lens unit of a positive refractive power less than that of the second lens group, including at least one positive lens element, wherein an air space between the first and second lens groups and an air space between the second lens group and third lens unit being changeable for zooming, the lens system fulfills the following condition:

$$2.5 < f_{III}/f_{II} < 4.5$$

wherein $f_{II}$ and $f_{III}$ represent the focal lengths of the second lens group and the third lens unit, respectively.

14. A zoom lens system comprising from the object to the image side:
- a first lens group of a negative refractive power including at least two positive lens elements and at least two negative lens elements;
- a second group of a positive refractive power, the second lens group being of a triplet type formed by sandwiching a negative refractive power component in between a pair of positive refractive power components, and including at least four positive lens elements and at least one negative lens element; and
- a third lens unit of a positive refractive power including at least one positive lens element, wherein an air space between the first and second lens groups and an air space between the second lens group and third lens unit are changeable for zooming, the lens system fulfills the following conditions:

$$2.5 < f_{III}/f_{II} < 4.0$$

$$1.0 < |f_{II}/f_I| < 1.5$$

$$4.5 < D_L/D_S < 19.0$$

wherein:
$f_I$, $f_{II}$ and $f_{III}$ represent the focal lengths of the first and second lens group and third lens unit, respectively;

$D_L$ represents the air space between the second lens group and the third lens unit for the longest focal length; and $D_S$ represents the air space between the second lens group and the third lens unit for the shortest focal length.

15. A zoom lens system comprising from the object to the image side:
- a first lens group of a negative refractive power including at least one positive lens element and at least one negative lens element;
- a second lens group of a positive refractive power, the second lens group being of a triplet type formed by sandwiching a negative refractive power component in between a pair of positive refractive power components; and
- a third lens unit of a positive refractive power including at least one positive lens element, wherein an air space between the first and second lens groups and an air space between the second lens group and the third lens unit are changeable for zooming and the third lens unit is movable along the optical axis with the first and second lens groups left stationary for focusing, the lens system fulfills the following conditions:

$$2.5 < f_{III}/f_{II} < 4.5$$

$$0.05 f_S < D_S < 0.25 f_S$$

$$0.01 f_L < D_L < 0.5 f_L$$

wherein:
$f_{II}$ and $f_{III}$ represent the focal lengths of the second lens group and third lens unit, respectively;

$D_S$ represents the air space between the second lens group and third lens unit in infinity focusing for the shortest focal length;

$D_L$ represents the air space between the second lens group and third lens unit in the infinity focusing for the longest focal length;

$f_S$ represents the shortest focal length of the whole lens system; and $f_L$ represents the longest focal length of the whole lens system.

16. The invention of claim 15, wherein the last mentioned condition is further limited as follows:

$$0.11 f_L < D_L < 0.5 f_L$$

17. The invention of claim 15, wherein the air space between the first and second lens groups for the shortest focal length is greater than that for the longest focal length and the air space between the second lens group and third lens unit for the shortest focal length is less than that for the longest focal length.

* * * * *